(12) United States Patent
Chen

(10) Patent No.: US 6,351,483 B1
(45) Date of Patent: Feb. 26, 2002

(54) LASER OPTICAL AXIS CORRECTING METHOD

(75) Inventor: Tony K. T. Chen, Taipei (TW)

(73) Assignee: Quarton, Inc. (TW)

( * ) Notice: Subject to any disclaimer, the term of this patent is extended or adjusted under 35 U.S.C. 154(b) by 0 days.

(21) Appl. No.: 09/106,418

(22) Filed: Jun. 29, 1998

(51) Int. Cl.[7] .............................. H01S 3/08; H01S 5/00; H01S 3/00; G01K 1/08
(52) U.S. Cl. ...................... 372/101; 372/107; 372/50; 250/398; 250/397
(58) Field of Search ................................ 372/101, 107, 372/50, 43, 108; 250/398, 397; 385/33, 88, 90, 31; 356/245, 252, 257; 350/96.17, 96.18, 96.19

(56) References Cited

U.S. PATENT DOCUMENTS

| | | |
|---|---|---|
| 4,965,532 A | 10/1990 | Sakurai |
| 5,001,649 A | 3/1991 | Lo et al. |
| 5,195,155 A * | 3/1993 | Shimaoka et al. ............ 385/90 |
| 5,210,650 A * | 5/1993 | O'Brien ....................... 359/820 |
| 5,421,829 A | 6/1995 | Olichney et al. |
| 5,425,704 A | 6/1995 | Sakurai et al. |
| 5,694,373 A | 12/1997 | Garde |
| 5,905,751 A * | 4/1999 | Huang et al. ................ 372/101 |

* cited by examiner

Primary Examiner—Leon Scott, Jr.
Assistant Examiner—Armando Rodriguez

(57) ABSTRACT

A method of correcting an optical axis of a laser projecting device is provided. According to this method, a cylindrical tubular member is provided, the tubular member made of a deformable material and having a base section, and a laser generation unit mounted inside the base section and adapted to project a laser beam along an optical axis. The tubular member is also provided with an extension section and a reduced-diameter circumferential groove between the base section and the extension section. Thereafter, the tubular member is rotated while projecting a laser beam from the tubular member towards a reference point in front of the tubular member that corresponds to a rotational axis of the tubular member. A spatial deviation between the optical axis and the reference point is detected, and the base section of the tubular member is deformed with respect to the extension section about the circumferential groove, and based on the spatial deviation, to cause the base section to be angularly displaced with respect to the tubular member until the optical axis and the rotational axis coincide.

15 Claims, 5 Drawing Sheets

LASER OPTICAL AXIS CORRECTING METHOD

BACKGROUND OF THE INVENTION

1. Field of the Invention

The present invention is related to a method for correcting the optical axis of a laser projecting device in order to have the optical axis coincident with a central axis of the laser projecting device, and in particular, to a method which detects the spatial deviation between the optical axis and the central axis and applies a force to deform a deformable holding member of the laser projecting device in such a way to make the optical axis coincident with the central axis.

2. Description of the Prior Art

Laser projecting devices have been widely used. The laser projecting device usually comprises a laser generation unit, such as a laser diode, to generate a laser beam. A control circuit is used to control the operation of the laser generation unit. A focusing lens may be provided to more precisely focus the laser beam generated by the laser generation unit. Such a laser projecting device has been used in a variety of fields, such as the so-called laser pointer which incorporates the laser projecting device in a pen-configured holder so as to generate a highlighted spot in front of the "pen", serving as visual indicating means. Other applications of the laser projecting device include, for example, use with a range-finder, a sighting device and a leveling instrument. FIG. 1 of the attached drawings shows an example of a laser generation unit which is designated with reference numeral 1 in the drawings. Commercially, the laser generation unit 1 is usually a metal-cased element having a transparent window 11 through which the laser beam is projected. The laser generation unit 1 has a plurality of terminal pins 12a, 12b and 12c through which the laser generation unit 1 is powered and controlled.

FIG. 2 shows the structure of a conventional laser projecting device which includes an elongated cylindrical tubular member 3, serving as a holder, inside which the laser generation unit 1 is fixed and held. The holder that holds the laser generation unit 1 therein will hereinafter be referred to as the laser holder. A circuit board 2 on which a control circuit is provided is attached to the laser holder 3 and is provided in electrical connection with the laser generation unit 1 through the terminal pins 12a, 12b and 12c. The laser holder 3 may include a focusing lens 30 positioned in front of the laser generation unit 1 to provide a more precise focusing effect for the laser beam. Besides holding the laser generation unit 1, the laser holder 3 also serves to protect and shield the laser generation unit 1.

To have the optical axis of the laser beam projected out of the laser projecting device in a manner coincident with a central axis of the laser projecting device, the design, manufacture and assembly of the laser projecting device requires close tolerance, otherwise the laser beam projected from the laser projecting device may suffer considerable spatial error or deviation of its spatial position/orientation. Such errors include an angular deviation between the theoretical axis of the laser generation unit and the central axis of the laser holder, which is usually within the range of 3 degrees, and a position deviation in either, the X-axis, Y-axis or Z-axis between the laser generation unit 2 and the laser holder 3, which is usually within the range of 80 microns. Such errors are generally unacceptable in applications that require high position precision. The angular deviation is also referred to herein as optical error, and the position deviation is also referred to as herein mechanical error.

To correct spatial errors, a previous attempt provided a plurality of bolts engaged within inner-threaded holes formed on the laser holder 3 and in contact engagement with the laser generation unit 1 located inside the laser holder 3 so that by adjusting the relative positions of the bolts with respect to the laser holder 3, the orientation of the laser generation unit 1 inside the laser holder 3, and thus the projecting angle of the laser beam generated thereby, are controllable. Such a method, although effective in eliminating the error of angular deviation, complicates the structure of the laser holder 3. Furthermore, it is very difficult to minimize the size of the laser projecting device if such a correcting method and structure is used. Moreover, such a method and structure may correct the optical error but this structure and method is generally unable to overcome the mechanical errors.

Thus, there is still a need for a method to correct the spatial deviation between the optical axis and the central axis of the laser holder so as to overcome the problems encountered in the prior art.

SUMMARY OF THE INVENTION

An object of the present invention is to provide an apparatus and method for correcting the optical axis of a laser projecting device so as to have the optical axis coincident with a central axis of the laser projecting device.

Another object of the present invention is to provide a method which is capable of correcting the optical axis of a laser projecting device in a ready and easy way without incorporating a more complicated structure.

The objects of the present invention may be achieved by providing a method of correcting an optical axis of a laser projecting device. According to this method, a cylindrical tubular member is provided, the tubular member made of a deformable material and having a base section, and a laser generation unit mounted inside the base section and adapted to project a laser beam along an optical axis. Thereafter, the tubular member is rotated while projecting a laser beam from the tubular member towards a reference point in front of the tubular member that corresponds to a rotational axis of the tubular member. A spatial deviation between the optical axis and the reference point is detected, and the base section of the tubular member is deformed based on the spatial deviation to cause the base section to be angularly displaced with respect to the tubular member until the optical axis and the rotational axis coincide.

According to one embodiment of the present invention, the tubular member is provided with an extension section and a reduced-diameter circumferential groove between the base section and the extension section, and the base section is deformed with respect to the extension section about the circumferential groove.

The above objects and other feature, advantages and objects of the present invention will become apparent from the following description of a preferred embodiment thereof with reference to the attached drawings, wherein:

DETAILED DESCRIPTION OF THE PREFERRED EMBODIMENT

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known circuits and components are omitted so as to not obscure the description of the present invention with unnecessary detail.

The present invention provides a method of making a laser projecting device that projects a laser beam that has been aligned to minimize spatial deviations. As described below, the method of the present invention is effective in minimizing both angular and position deviations. The present invention provides a novel structure for a laser projecting device, which is then subjected to adjustment, alignment, and final treatment according to the methods described hereinbelow.

Figure 1:
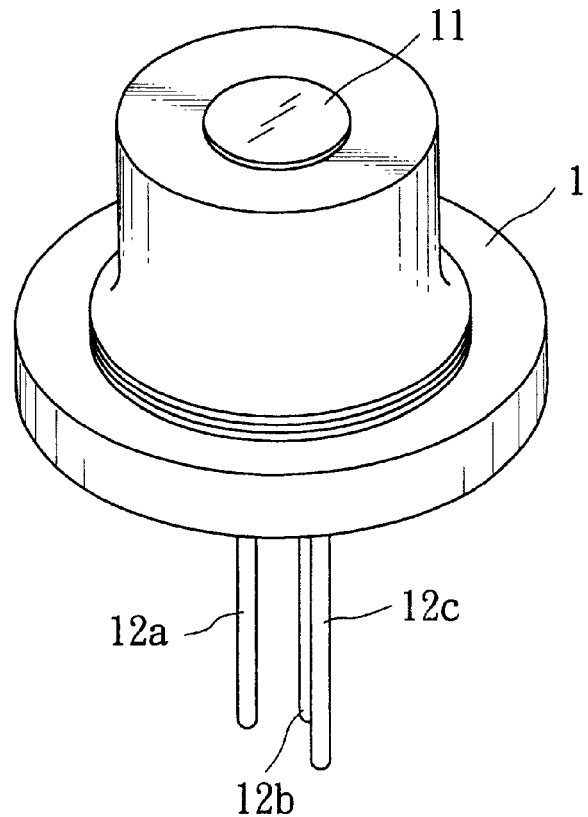
FIG. 1 is a perspective view showing a conventional laser generation unit which is to be adapted in the present invention.
Figure 2:
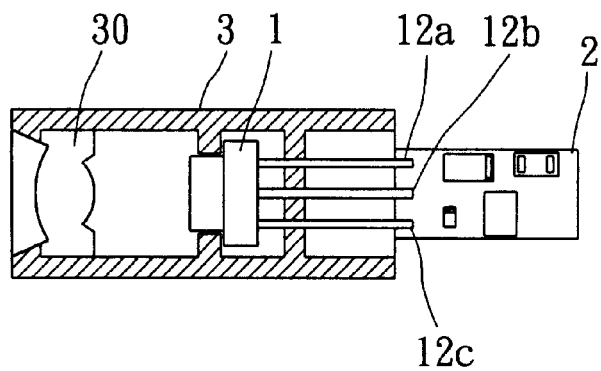
FIG. 2 is a cross-sectional view showing a conventional laser projecting device.
Figure 3:
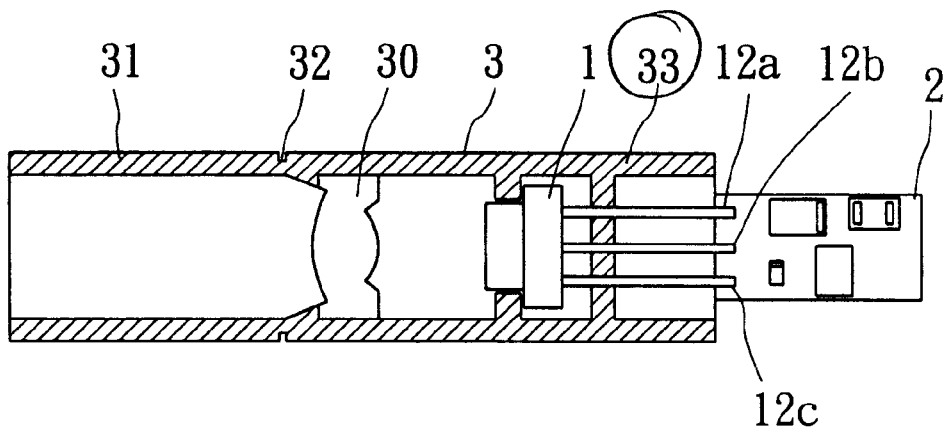
FIG. 3 is cross-sectional view showing a laser projecting device in accordance with one embodiment of the present invention.

With reference to the drawings and in particular to FIG. 3, wherein a laser projecting device in accordance with the present invention is shown in a cross-sectional view, the laser projecting device of the present invention includes an elongated cylindrical tubular member 3, serving as a laser holder, inside which a laser generation unit 1, such as a laser diode, is fixed to generate and project a laser beam through a focusing lens 30 that is also fixed inside the holder 3 and in front of the laser generation unit 1. The laser generation unit 1 and the focusing lens 30 are mounted inside the tubular member 3 according to methods known in the art.

Figure 4:
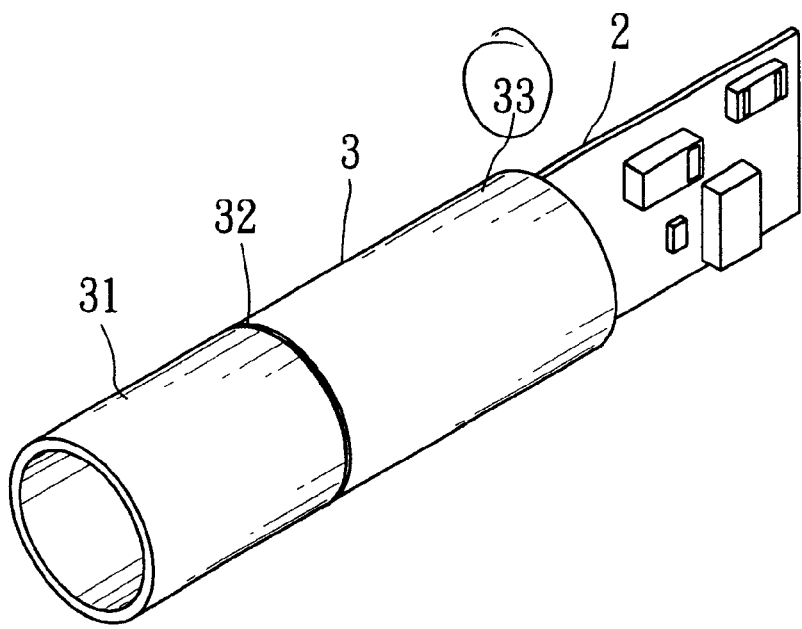
FIG. 4 is a perspective view of the laser projecting device of FIG. 3.

A circuit board 2 is attached to the laser holder 3 and is provided in electrical connection with the laser generation unit 1 by means of terminal pins 12a, 12b and 12c of the laser generation unit 1 to control/activate the laser generation unit 1 to emit a laser beam. FIG. 4 shows a perspective view of the laser projecting device of FIG. 3.

The circuit board 2 includes a control circuit thereon to control the activation of the laser generation unit 1. Since such circuits are well known to those skilled in the art, no further detail will be provided herein.

The elongated laser holder 3 includes a base section 33, serving as the conventional laser holder, from which an extension section 31 extends. A circumferential groove 32 is formed between the extension section 31 and the elongated laser holder 3. The holder 3 is preferably made of a material that is capable of being deformed, bent and cut, such as copper alloys. The groove 32 provides a reduced diameter portion which allows a more ready deformation of the material of the laser holder 3, as described in greater detail below.

Figure 5:
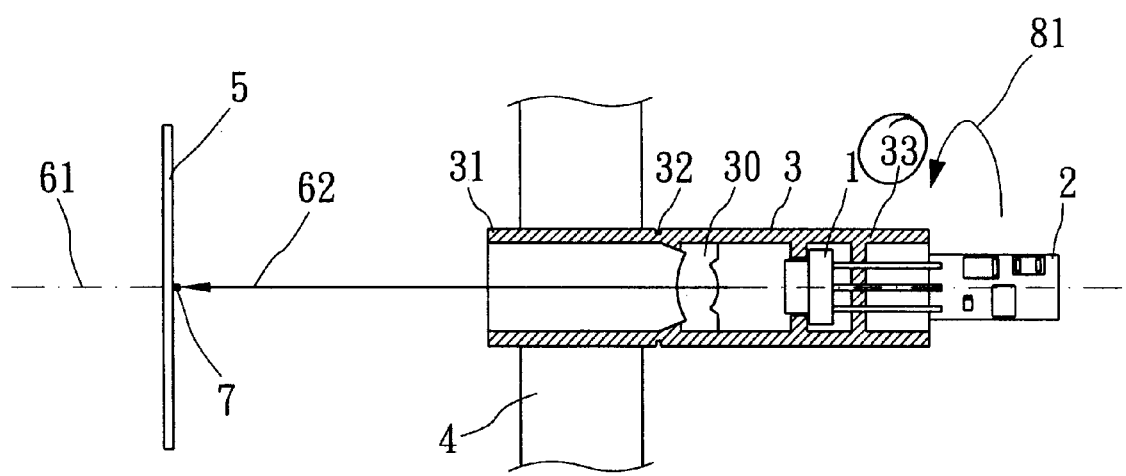
FIG. 5 is a cross-sectional view illustrating the use of a chuck to hold and rotate the laser projecting device of FIG. 3 in correcting the optical axis thereof.

In correcting the optical axis of the laser beam generated by the laser generation unit 1 in order to have the optical axis coincident with a central axis of the laser holder 3 with respect of the cylindrical outside surface of the laser holder 3, the present invention provides a rotatable chuck or jig or similar clamping device 4 that is used to securely hold the extension section 31 of the laser holder 3, as shown in FIG. 5. The clamping device 4 can be the chuck of a conventional lathe (not shown). A reference plane 5 is positioned in front of the laser projecting device and a reference point 7 is selected on the reference plane 5. The reference point 7 is selected to be exactly corresponding to the rotational or central axis 61 of the rotatable chuck 4 so that the reference point 7 may be defined by the intersection of the rotational axis of the chuck 4 with the reference plane 5.

Figure 6:
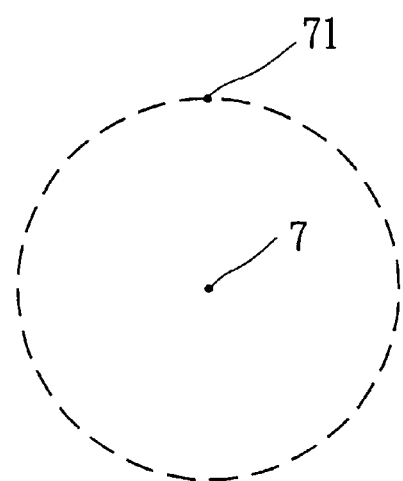
FIG. 6 is a schematic view showing a circular path followed by a laser beam projected from the laser projecting device of FIG. 3 that has an angularly deviated optical axis, as well as reference point which indicates the rotation center.

The chuck 4 and the laser projecting device are then rotated in unison, as indicated by arrow 81 of FIG. 5. A laser beam having an optical axis 62 is caused to project from the laser generation unit 1 of the laser projecting device onto the reference plane 5. In an ideal situation, the laser beam optical axis 62 is coincident with the rotational axis 61 of the chuck 4 so that a highlighted light spot formed by the laser beam on the reference plane 5 is exactly coincident with the reference point 7. However, due to manufacturing tolerances and errors, there is always the possibility of angular and/or position deviation or error occurring between the laser generation unit 1 and the laser holder 3 so that, with the rotation of the chuck 4, the highlighted light spot of the laser beam travels along a circle centered at the reference point 7 as shown in FIG. 6 in which reference numeral 71 indicates the circular path of the light spot of the laser beam on the reference plane 5.

Figure 7:
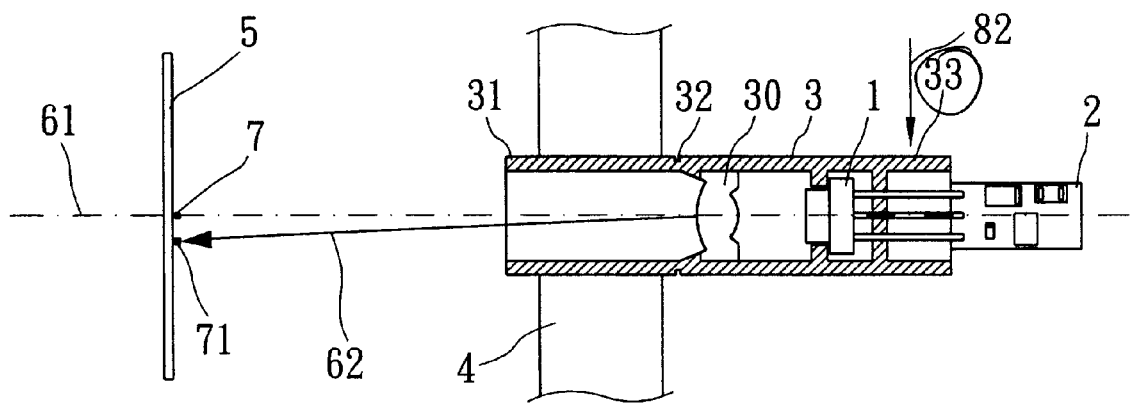
FIG. 7 is a cross-sectional view illustrating the angular deviation of the optical axis and the situation where a force is applied to the laser holder of FIG. 3 to correct the deviated optical axis.

FIG. 7 illustrates such a situation where there is an angular deviation between the optical axis 62 and the rotational axis 61 of the chuck 4. It should be noted that the angular deviation is exaggerated for the purpose of illustrating this phenomenon. The actual angular deviation between the optical axis 62 and the chuck rotational axis 61 may be smaller.

Figure 8:
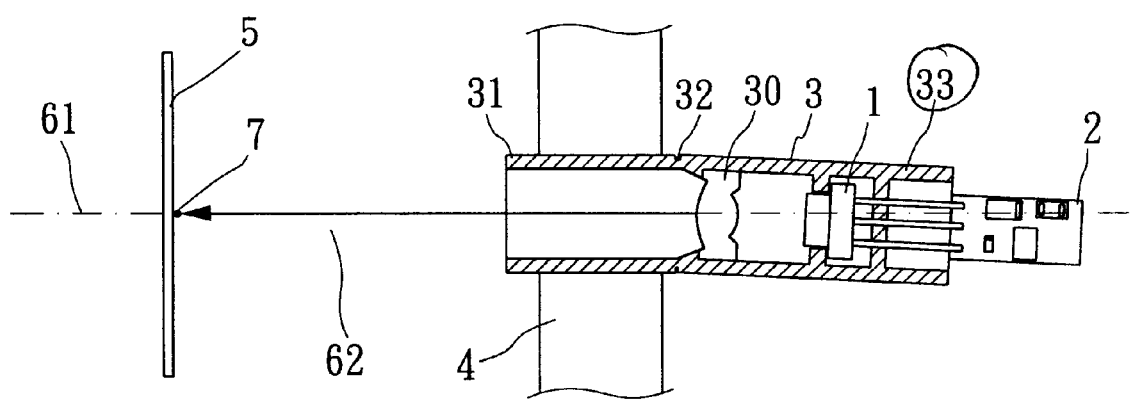
FIG. 8 is a cross-sectional view illustrating the corrected optical axis of the laser projecting device of FIG. 7.

The above-described procedure is first used to detect the presence of angular deviation between the optical axis 62 and the rotational axis 61. Once the deviation has been found, the rotation of the chuck 4 is stopped and a force is applied to the base section 33 of the laser holder 3, as indicated by arrow 82 in FIG. 7, so as to cause the housing of the holder 3, and in particular, the base section 33, to be bent downwardly in the direction of arrow 82 about the circumferential groove 32. When the holder 3 is bent in this manner, the base section 33 becomes angularly displaced relative to the optical axis 62 and the extension section 31 (which is being held in a fixed position by the clamping device 4), so that the laser generation unit 1 that is supported in the base section 33 is also angularly displaced to change the angles at which the laser beams are projected, thereby correcting the deviation and causing the optical axis 62 to be coincident with the rotational axis 61, as shown in FIG. 8. In addition, bending the holder 3 in this manner will cause the circumferential groove 32 to be deformed so that the groove 32 will be widened or opened up along the side of the base section 33 where the force is applied, and the groove 32 will be closed (or bent inwardly) along the side of the base section 33 that is opposite to the side from which the force is being applied. Thus, the circumferential groove 32 provides a smaller-diameter or weakened portion in the wall of the housing of the holder 3 which can be deformed.

It is noted from the description above that the projecting angle of the laser beam can be corrected to have the optical axis 62 thereof coincident with the rotational axis 61 of the clamping device 4 by clamping and holding the extension section 31 of the laser holder 3 and applying a force to the base section 33 of the laser holder 3 to cause deformation at the circumferential groove 32. However, instead of using a chuck as the clamping device 4, it is also possible to provide a special purpose jig to hold the laser holder 3 in order to adjustment the optical axis 62 as described above. The force applied to the base section 33 of the laser holder 3 may be either a manual force provided by an operator or a known mechanical bending tool.

Figure 9:
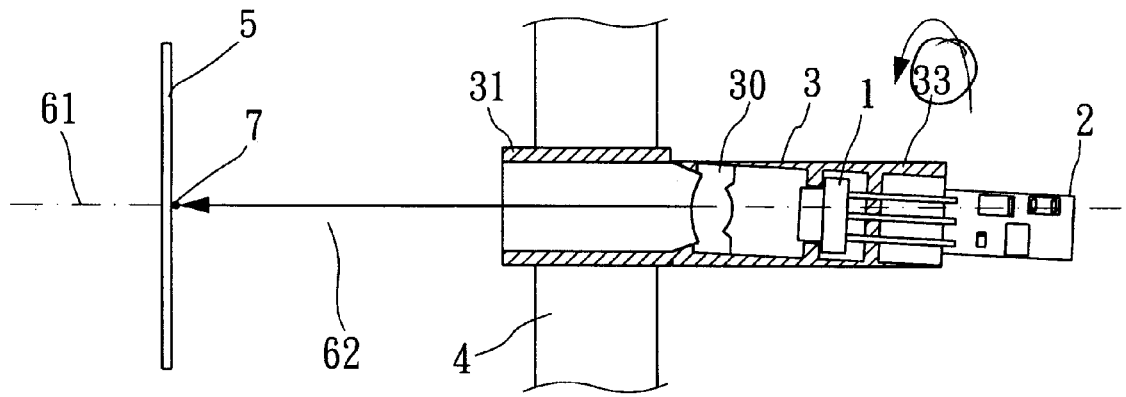
FIG. 9 is a cross-sectional view showing surface machining of the laser holder of FIG. 8.
Figure 10:
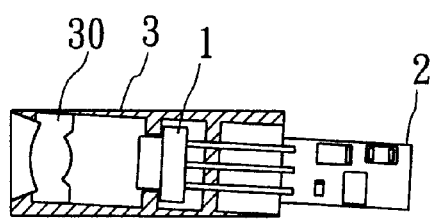
FIG. 10 is a cross-sectional view showing the device of FIG. 9 after the surface machining operation.

A turning device, such as the lathe mentioned above or other suitable machine tool, is then used in conjunction with a roughing tool to machine the cylindrical outer surface of the base section 33 of the laser holder 3 so that the central axis of the outer cylindrical surface of the laser holder 3 is coincident with the rotational axis 61 of the chuck 4 and thus coincident with the optical axis 62 of the laser generation device 1. In particular, the lathe rotates the laser holder 3 while the roughing tool machines the outer surface of the base section 33. The surface machining operation is terminated at the circumferential groove 32, as shown in FIG. 9. The extension section 31 is then transversely cut by a known cutting tool through the groove 32 to remove the extension section 31, to provide the assembly shown in FIG. 10.

Figure 11:
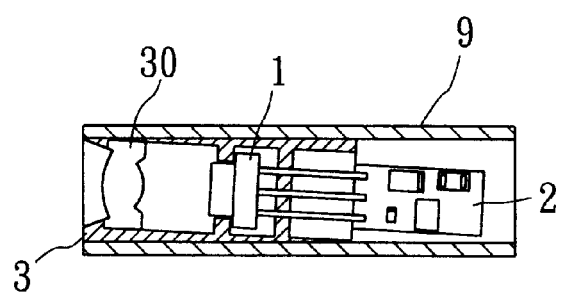
FIG. 11 is a cross-sectional view showing the fitting of an outer sheath over the surface-machined laser projecting device of FIG. 10.

Thereafter, a sheath 9 may then be fitted over the machined outer surface of the laser holder 3 to provide a finished laser projecting device (as shown in FIG. 11) that has its optical axis coincident with the central axis of the laser holder 3. The sheath 9 may be fitted by sliding the sheath 9 over the laser projective device of FIG. 10 from the direction of the circuit board 2 until the sheath 9 completely encapsulates the laser projecting device, at which time the laser holder 3 and the sheath 9 are pressed together to form the final assembly shown in FIG. 11. The sheath 9 can be made of stainless steel, and is provided to protect the circuit board 2 and the other internal components of the laser projecting device.

Thus, as illustrated in FIG. 11, the laser generation unit 1 and the focusing lens 30 are positioned at an angle with respect to the inner wall of the base section, as compared with FIG. 3 where the laser generation unit 1 and the focusing lens 30 are positioned generally parallel to the inner wall of the base section. In addition, the present invention provides a method and structure for correcting the spatial deviation of the optical axis of the laser projected beam that addresses both angular deviation and position deviation. In this regard, it can be seen that the deformation of the base section 33 and the adjustment of the optical axis of the laser generation unit 1 corrects all spatial deviations, regardless of whether the spatial deviation was caused by angular or position deviation.

Although the preferred embodiment has been described to illustrate the present invention, it is apparent that changes and modifications in the specifically described embodiment can be carried out without departing from the scope of the invention which is intended to be limited only by the appended claims.

What is claimed is:

1. A method of correcting an optical axis of a laser projecting device, comprising the steps of:
 (a) providing a cylindrical tubular member made of a deformable material and comprising a base section, a laser generation unit mounted inside the base section and adapted to project a laser beam along an optical axis, the tubular member having an extension section and a reduced-diameter circumferential groove between the base section and the extension section;
 (b) rotating the tubular member;
 (c) providing a reference point in front of the tubular member that corresponds to a rotational axis of the tubular member;
 (d) projecting a laser beam from the tubular member towards the reference point;
 (e) detecting a spatial deviation between the optical axis and the reference point; and
 (f) deforming the base section of the tubular member based on the spatial deviation to cause the base section to be angularly displaced with respect to the tubular member until the optical axis and the rotational axis coincide.

2. The method of claim 1, wherein step (b) further includes the steps of:
 (b1) holding the extension section of the tubular member with a clamping device; and
 (b2) rotating the clamping device.

3. The method of claim 1, wherein step (f) further include the steps of:
 (f1) deforming the base section with respect to the extension section about the circumferential groove.

4. The method of claim 1, wherein step (f) further includes the step of:
 (f1) applying a force to the base section to deform the base section.

5. The method of claim 3, further including the step of:
 (g) machining an outer cylindrical surface of the base section so that a central axis of the outer cylindrical surface of the base section is coincident with the rotational and optical axes.

6. The method of claim 5, further including the step of:
 (h) removing the extension section.

7. The method of claim 6, further including the step of:
 (i) fitting an outer sheath over the machined outer cylindrical surface of the base section.

8. A laser projecting device made according to the following steps:
 (a) providing a cylindrical tubular member made of a deformable material and comprising a base section, a laser generation unit mounted inside the base section and adapted to project a laser beam along an optical axis, the tubular member having an extension section and a reduced-diameter circumferential groove between the base section and the extension section;
 (b) rotating the tubular member;
 (c) providing a reference point in front of the tubular member that corresponds to a rotational axis of the tubular member;
 (d) projecting a laser beam from the tubular member towards the reference point;
 (e) detecting a spatial deviation between the optical axis and the reference point; and (f) deforming the base section of the tubular member based on the spatial deviation to cause the base section to be angularly displaced with respect to the tubular member until the optical axis and the rotational axis coincide.

9. The device of claim 8, wherein step (b) further includes the steps of:

(b1) holding the extension section of the tubular member with a clamping device; and (b2) rotating the clamping device.

10. The device of claim 8, wherein step (f) further include the steps of:

(f1) deforming the base section with respect to the extension section about the circumferential groove.

11. The device of claim 8, wherein step (f) further includes the step of:

(f1) applying a force to the base section to deform the base section.

12. The device of claim 10, further including the step of:

(g) machining an outer cylindrical surface of the base section so that a central axis of the outer cylindrical surface of the base section is coincident with the rotational and optical axes.

13. The device of claim 12, further including the step of:

(h) removing the extension section.

14. The device of claim 13, further including the step of:

(i) fitting an outer sheath over the machined outer cylindrical surface of the base section.

15. The method of claim 1, further including the step of:

(g) removing the extension section.

* * * * *